US011815251B1

(12) United States Patent
Woo et al.

(10) Patent No.: US 11,815,251 B1
(45) Date of Patent: Nov. 14, 2023

(54) SMART LIGHTING DEVICE EQUIPPED WITH USER INTERFACE CAPABLE OF GESTURE RECOGNITION

(71) Applicant: TANGRAM FACTORY, INC., Seoul (KR)

(72) Inventors: Sung Kyou Woo, Seoul (KR); Sang Hyun Kang, Seoul (KR); Tae Woo Lee, Seoul (KR)

(73) Assignee: TANGRAM FACTORY, INC., Seoul (KR)

( * ) Notice: Subject to any disclaimer, the term of this patent is extended or adjusted under 35 U.S.C. 154(b) by 0 days.

(21) Appl. No.: 17/979,475

(22) Filed: Nov. 2, 2022

(30) Foreign Application Priority Data

Sep. 22, 2022 (KR) .......................... 10-2022-0119716

(51) Int. Cl.
| F21V 23/04 | (2006.01) |
| F21S 4/28 | (2016.01) |
| F21V 21/26 | (2006.01) |
| F21Y 115/10 | (2016.01) |
| H05B 47/115 | (2020.01) |
| F21S 6/00 | (2006.01) |

(52) U.S. Cl.
CPC ............. *F21V 23/0471* (2013.01); *F21S 4/28* (2016.01); *F21V 21/26* (2013.01); *F21S 6/003* (2013.01); *F21Y 2115/10* (2016.08); *H05B 47/115* (2020.01)

(58) Field of Classification Search
CPC ........ F21V 23/0471; F21V 21/26; F21S 4/28; H05B 47/115
See application file for complete search history.

(56) References Cited

U.S. PATENT DOCUMENTS

| 2016/0084486 A1* | 3/2016 | Chen .................. F21S 6/003 |
| | | 362/373 |
| 2017/0171943 A1* | 6/2017 | Möller ................. H05B 47/13 |
| 2017/0356633 A1* | 12/2017 | Volek ................... F21V 19/003 |
| 2018/0213627 A1* | 7/2018 | Xia ......................... H03K 17/96 |
| 2018/0306431 A1* | 10/2018 | Watanabe ............ H04N 9/3179 |
| 2019/0353343 A1* | 11/2019 | Pan ....................... F21V 21/26 |
| 2020/0355359 A1* | 11/2020 | Pan ..................... H05B 47/115 |

FOREIGN PATENT DOCUMENTS

| KR | 10-2011-0050142 A | 5/2011 |
| KR | 20-2012-0005771 U | 8/2012 |

* cited by examiner

*Primary Examiner* — Tracie Y Green
*Assistant Examiner* — Michael Chiang
(74) *Attorney, Agent, or Firm* — Stein IP, LLC (57) ABSTRACT

Disclosed herein is a smart lighting device equipped with a user interface capable of gesture recognition, the smart lighting device including: a main body provided with a light-emitting diode (LED) lighting unit; a sensing unit embedded in the main body, and configured to detect a gesture of a user's hand and to generate sensing information for the gesture; an integrated control unit embedded in the main body, and configured to control individual units so that a setting adjustment for any one of control modes, including at least any one of a brightness setting, color temperature setting, and timer setting of the LED lighting unit and ON/OFF control, corresponding to the sensing information can be made based on previously stored control information; and a power supply unit configured to supply an operating voltage so that the LED lighting unit, the sensing unit, and the integrated control unit can operate.

7 Claims, 6 Drawing Sheets

SMART LIGHTING DEVICE EQUIPPED WITH USER INTERFACE CAPABLE OF GESTURE RECOGNITION

CROSS-REFERENCE TO RELATED APPLICATION

This application claims the benefit of Korean Patent Application No. 10-2022-0119716 filed on Sep. 22, 2022, which is hereby incorporated by reference herein in its entirety.

BACKGROUND

1. Technical Field

The present invention relates generally to a smart lighting device equipped with a user interface capable of gesture recognition, and more particularly to a desk lamp that is a desk lamp-type lighting device.

2. Description of the Related Art

With the spread of working from home and remote classes due to the coronavirus, the home office market, whose main customers were freelancers and start-up-type one-man companies, is expanding to general office workers and students. Accordingly, desk lamps have also accounted for a large proportion of home office-related sales.

A desk lamp is placed on a desk, and illuminates an area of the desk at an appropriate illuminance level when a user reads a book or does work. Accordingly, a desk lamp has the advantage of increasing concentration compared to common lighting devices installed on ceilings.

In this case, a desk lamp generally includes: a lighting unit composed of light-emitting diodes (LEDs); a support configured to support the lighting unit so that the lighting unit is located at the level of a user's eyes and illuminates a predetermined area; and a base configured such that a main circuit board capable of controlling the functions of the lighting unit is embedded therein, the support is coupled to the top end thereof, and the bottom end thereof is disposed on a desk and supports the lighting unit.

The technologies related to a desk lamp are disclosed in Korean Utility Model Application Publication No. 20-2012-0005771 (filed on Feb. 7, 2011, published on Aug. 17, 2012, and entitled "LED Desk Lamp"), Korean Patent Application Publication No. 10-2011-0050142 (filed on Nov. 6, 2009, published on May 13, 2011, and entitled "LED Desk Lamp"), etc.

Such conventional desk lamps are provided such that the functions, such as ON/OFF and brightness control, of the LEDs of a lighting unit can be controlled through switches provided in any one of the components of the desk lamps, such as the upper surface of a base, the front surface of a support, and the top surface of the lighting unit (e.g., the rear surface of a radiation surface onto which light is radiated).

In this case, in the conventional desk lamp, in order to operate additional functions such as brightness and color temperature suitable for a user's situation as well as ON/OFF of lighting, the operation of switches through contact has to be performed. Depending on the location at which the desk lamp is disposed on a desk, the excessive movement of the user is required to manipulate the switches, which causes inconvenience in use.

In addition, when working from home or remote classes are performed, electronic devices such as monitors, tablet PCs, and laptops are placed on the desk along with a desk lamp and an area of the desk on which the above devices are placed is illuminated with the desk lamp. In this case, since the conventional desk lamp does not take this into consideration at all, the following inconveniences may be caused.

For example, when such a desk lamp and a monitor are used together, the location of the lighting unit of the desk lamp is lower than the location of the top end of the monitor, so that the lighting unit may cover a part of the screen of the monitor and is irritating to the eyes of a user. In this case, in order to minimize the partial covering of the screen by the lighting unit, the angle between the support and the lighting unit may be changed such that the radiation surface of the lighting unit faces a desk at an inclined angle. In this case, part of the light radiated from the lighting unit is directly exposed to a user's eyes, and dazzle may be caused.

Meanwhile, there is a trend to minimize the proportion of a desk lamp on a desk so that a user can utilize the space on the desk as wide as possible. For this purpose, it may first be contemplated that the size of a base placed on a desk is minimized. The base is a component configured to support a support and a lighting unit, and also the sizes (or weights) of the support and the lighting unit supported by the base need to be reduced.

However, as the lighting unit is formed to be thinner in order to minimize the size (or weight) thereof, the problem of heat generation caused by LEDs becomes more unavoidable. Since the problem of heat generation is directly related to the lifespan and safety of a product, there is a demand for the development of technology capable of overcoming this problem.

SUMMARY

The present invention has the following objects to solve the above-described problems: First, an object of the present invention is to provide a smart lighting device equipped with a user interface capable of gesture recognition that enables the non-contact control of all functions to be performed through user gesture recognition by taking into consideration user convenience and safety.

Second, an object of the present invention is to provide a smart lighting device equipped with a user interface capable of gesture recognition that has an optimal size and structure by taking into consideration use along with an electronic device disposed on a desk.

In order to accomplish the above objects, an aspect of the present invention provides a smart lighting device equipped with a user interface capable of gesture recognition, the smart lighting device including: a main body provided with a light-emitting diode (LED) lighting unit; a sensing unit embedded in the main body, and configured to detect a gesture of a user's hand located a predetermined distance apart from a region of the main body and to generate sensing information for the gesture of the user's hand; an integrated control unit embedded in the main body, and configured to control individual units so that a setting adjustment for any one of control modes, including at least any one of a brightness setting, color temperature setting, and timer setting of the LED lighting unit and ON/OFF control, corresponding to the sensing information can be made based on previously stored control information; and a power supply unit configured to supply an operating voltage so that the LED lighting unit, the sensing unit, and the integrated control unit can operate.

The smart lighting device may further include a status display unit provided in the main body and configured to display status information about at least any one of the control mode of the LED lighting unit controlled by the integrated control unit and a setting adjustment status therefor to the outside.

The sensing unit may be provided as an infrared laser sensor configured to calculate distance information from a region of the main body to the user's hand by using a Time of Flight (ToF) method and to generate sensing information about a gesture of the user's hand, in which the user's hand approaches to or recedes from the region of the main body, from the distance information.

The integrated control unit may control the LED lighting unit and the status display unit so that, as a change of control mode to the control mode corresponding to the sensing information generated by the sensing unit is made or a setting adjustment for the corresponding control mode is made, corresponding state information is output as at least one of an optical signal and a sound signal.

The main body may include: a first body configured such that a plurality of LED chips constituting the LED lighting unit are arranged along the longitudinal direction thereof; a second body coupled to the opposite side of the first body, and configured to support the first body; a hinge coupling portion configured to hingedly couple the first body and the second body to each other so that the location of the first body can be fixed at a desired angle while the first body is rotated with respect to the second body; and a base provided in a plate shape having a predetermined thickness, formed such that the second body is coupled to the top surface thereof, and configured to support the first body and the second body coupled to each other by the hinge coupling portion; and at least any one of the first body, the second body, the hinge coupling portion, and the base may be made of aluminum.

Each of the first body and the second body may include a first portion having a straight tubular shape, a bent portion having a curved tubular shape that extends from the first portion and is bent in one direction, and a second portion having a straight tubular shape that extends from the bent portion; the first portion has a longer length than the second portion; and the first body and the second body may be configured such that the second portions thereof are coupled to the hinge coupling portion, and may be provided in shapes symmetrical to each other with respect to the hinge coupling portion.

The sensing unit may be disposed on one end side of the first body, and may detect a gesture of the user's hand in which the user's hand approaches to or recedes from one end of the first body.

According to another aspect of the present invention, there is provided a smart lighting device equipped with a user interface capable of gesture recognition, the smart lighting device including: a first body configured such that a plurality of LED chips constituting an light-emitting diode (LED) lighting unit are arranged along the longitudinal direction thereof; a second body coupled to the opposite side of the first body, and configured to support the first body; a hinge coupling portion configured to hingedly couple the first body and the second body to each other so that the location of the first body can be fixed at a desired angle while the first body is rotated with respect to the second body; a base provided in a plate shape having a predetermined thickness, formed such that the second body is coupled to the top surface thereof, and configured to support the first body and the second body coupled to each other by the hinge coupling portion; a sensing unit disposed on one end side of the first body, and configured to detect a gesture of a user's hand in which the user's hand approaches to or recedes from one end of the first body and to generate sensing information for the gesture of the user's hand; and an integrated control unit embedded in the first body, and configured to control the operation of the LED lighting unit so that a setting adjustment for any one of control modes, including at least any one of a brightness setting, color temperature setting, and timer setting of the LED lighting unit and ON/OFF control, corresponding to the sensing information can be made based on previously stored control information.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Embodiments of the present invention will be described in more detail below with reference to the accompanying drawings. Descriptions of technical parts that have already been well known will be omitted or abridged for the sake of brevity of description.

<Description of Smart Lighting Device Equipped with a User Interface Capable of Gesture Recognition>

Figure 1:
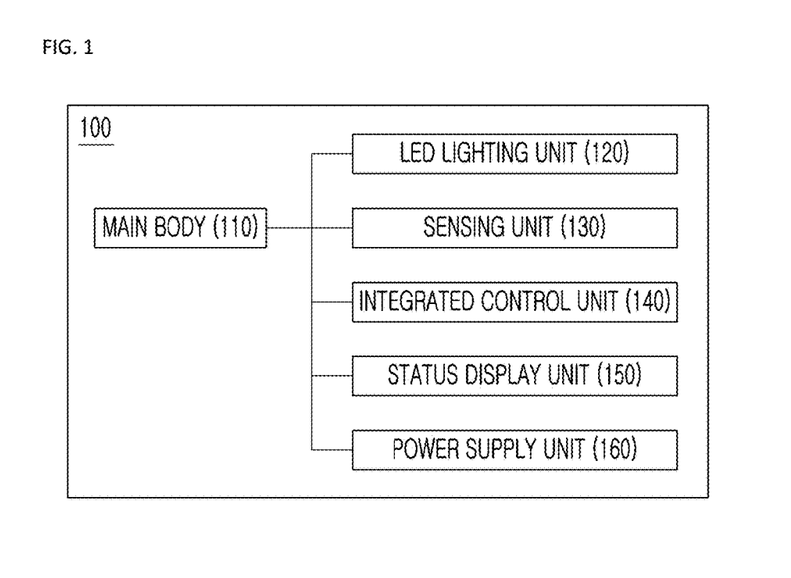
FIG. 1 is a block diagram of a smart lighting device equipped with a user interface capable of gesture recognition according to an embodiment of the present invention.
Figure 2:
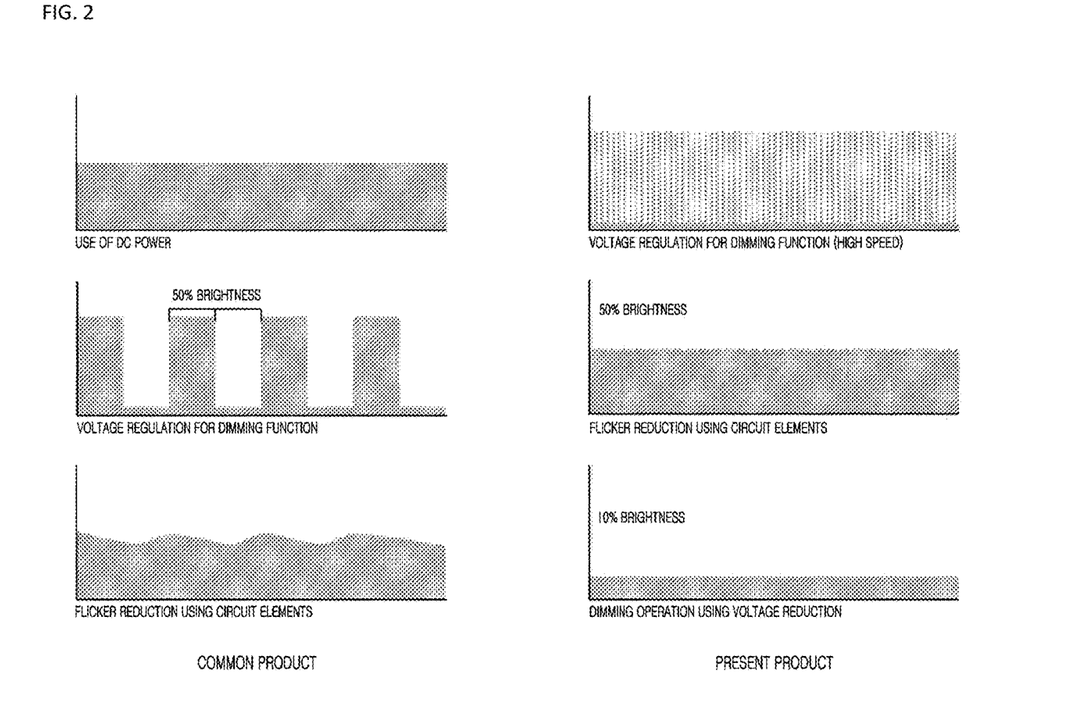
FIG. 2 is a view illustrating an example of a flicker-free implementation in the smart lighting device equipped with a user interface capable of gesture recognition according to the embodiment of the present invention.

FIG. 1 is a block diagram of a smart lighting device 100 equipped with a user interface capable of gesture recognition (hereinafter referred to as a "smart lighting device") according to an embodiment of the present invention, and FIG. 2 is a view illustrating an example of a flicker-free implementation in the smart lighting device according to the embodiment of the present invention.

Referring to FIG. 1, the smart lighting device 100 according to the embodiment of the present invention includes a main body 110, a sensing unit 130, an integrated control unit 140, a status display unit 150, and a power supply unit 160.

The main body 110 is provided with a light-emitting diode (LED) lighting unit 120, and is configured to have a disposition space in which individual units to be described later are disposed. A detailed description of the main body 100 will be given later.

The sensing unit 130 is embedded in the main body 110, and is configured to detect a gesture of a user's hand located a predetermined distance apart from a region of the main body 110 and to generate sensing information for the gesture of the user's hand.

In this case, the sensing unit 130 may be provided as an infrared laser sensor configured to calculate distance information from a region of the main body 110 to the user's hand by using a Time of Flight (ToF) method and to generate sensing information about a gesture of the user's hand, in which the user's hand approaches to or recedes from the region of the main body, from the distance information.

In this case, the sensing unit 130 may include: an emitter (not shown) configured to radiate light in the infrared range of the electromagnetic spectrum; a collector (not shown) disposed to be spaced apart from the emitter by a predetermined distance, and configured to receive the light that is reflected from the emitter, collides with an object (e.g., a user's hand) and is reflected from the object; and a sensing information generation part (not shown) configured to calculate the distance between the sensor and the object from the light received by the collector, and to generate the gesture of the user's hand as sensing information from one side of the main body 110 on which the sensing unit 130 is disposed.

In this case, gestures of a user's hand may include: a first gesture in which the user's hand is located in front of the main body (more specifically, the first body 111 to be described later) on which the sensing unit 130 is disposed, i.e., in the sensing area of the sensor, for a predetermined period of time; a second gesture in which the user's hand is located within the sensing area and then moved out of the sensing area or vice versa; and a gesture in which the user's hand moves along the longitudinal direction of the main body (e.g., the first body 111) on which the sensing unit 130 is disposed, i.e., a third gesture in which the user's hand approaches to or recedes from the sensor. It is obvious that this is one embodiment, so that the number of types of gestures recognized by the sensing unit 130 may be increased or decreased according to implementation.

The integrated control unit 140 is embedded in the main body 110, and is configured to control individual units so that a setting adjustment for any one of the control modes, including at least any one of the brightness setting, color temperature setting, and timer setting of the LED lighting unit 120 and ON/OFF control, corresponding to the sensing information can be made based on previously stored control information.

In this case, the integrated control unit 140 controls the LED lighting unit 120 and the status display unit 150 to be described later so that, as a change of mode to a control mode corresponding to the sensing information generated by the sensing unit 130 is made or a setting adjustment for the corresponding control mode is made, corresponding state information is output as at least one of an optical signal and a sound signal.

For reference, the control information refers to information about the recognition of each control mode corresponding to each gesture (e.g., the first gesture, the second gesture, or the third gesture) included in sensing information and about a setting adjustment for the control mode so that overall control for the ON/OFF, brightness setting, color temperature setting, and timer setting of the LED lighting unit 120 can be performed through the recognition of the gestures of the user's hand.

The status display unit 150 is provided in the main body 110, and is configured to display status information about at least any one of the control mode of the LED lighting unit 120 controlled by the integrated control unit 140 and a setting adjustment status therefor to the outside. In this case, the status display unit 150 may output at least one of an optical signal and a sound signal through an output means.

The power supply unit 160 is configured to supply an operating voltage so that the LED lighting unit 120, the sensing unit 130, the integrated control unit 140, and the status display unit 150 can operate. The power supply unit 160 may receive power from an external power source and provide the applied voltage to individual units.

In this case, the above-described LED lighting unit 120, sensing unit 130, integrated control unit 140, status display unit 150, and power supply unit 160 may be disposed on the PCB and electrically connected to each other. In this case, a power supply line W connected to the power supply unit 160 may be exposed out of the main body 110 by taking into consideration the distance between the power supply unit 160 and an external power source.

In this case, the operations of the respective units 120 to 160 performed to control all the functions of the LED lighting unit 120 will be discussed in detail in the following description of the control of the smart lighting device to be given later.

For reference, the smart lighting device 100 according to the embodiment of the present invention may include a flicker removal unit (not shown) configured to remove flicker generated from light radiated through the LED lighting unit 120.

In this case, the flicker removal unit is provided as a high-speed LED driver, is mounted on a PCB together with the above-described individual units, and enables the voltage, supplied from the power supply unit 160 to the LED lighting unit 120, to be more stably supplied under the control of the integrated control unit 140.

Referring to FIG. 2, more specifically, when an LED product is turned on using a direct current (DC) power source or a voltage is adjusted using a variable resistor for brightness control, flicker does not occur. However, the noise generated from power is directly reflected in an LED.

In addition, in the case of an LED lamp that controls brightness (e.g., dimming) in a normal digital circuit, a voltage can be made constant by using a separate circuit for removing flicker. However, in this case, as illustrated in FIG. 2, it can be seen that the voltage is not completely leveled according to the frequency and noise is still present.

In contrast, it can be seen that the smart lighting device 100 proposed by the present invention uses a high-speed LED driver to increase the frequency, thereby stably supplying voltage compared to general products. Accordingly, the smart lighting device 100 proposed by the present invention radiates high color rendering light (e.g., having a color rendering index (CRI) of 95% or higher) to which a flicker-free feature is applied. Accordingly, effects may be achieved in that problems, such as a user's headache, eye fatigue, and loss of vision, attributable to flicker are eliminated and myopia prevention, an improvement in learning, a sound sleep effect, and accurate color realization are achieved by lowering the wavelength of blue light and using light similar to natural light.

Figure 3:
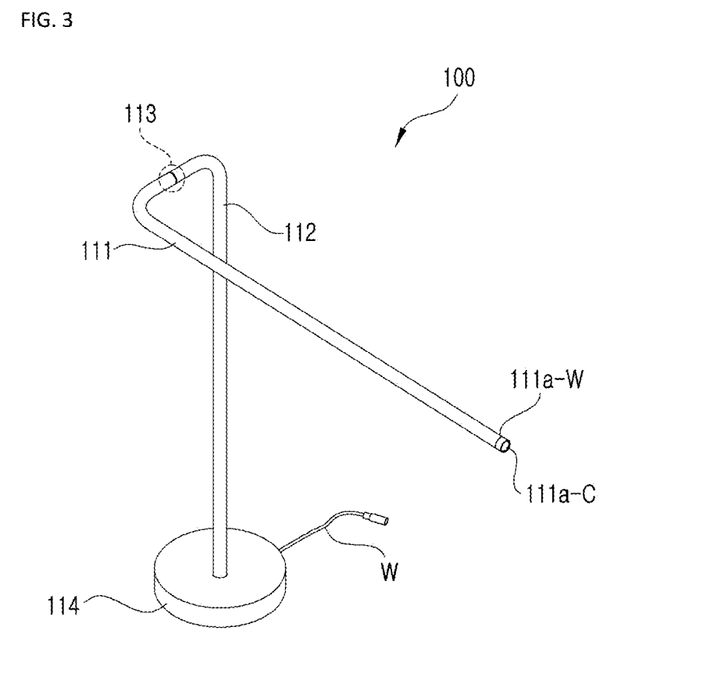
FIGS. 3 and 4 are views of the smart lighting device equipped with a user interface capable of gesture recognition according to the embodiment of the present invention.
Figure 4:
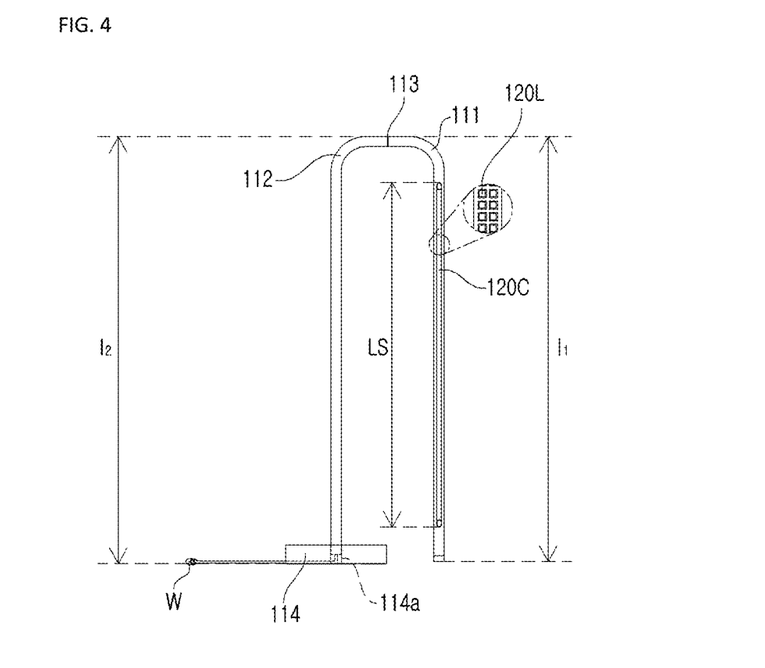
Figure 5:
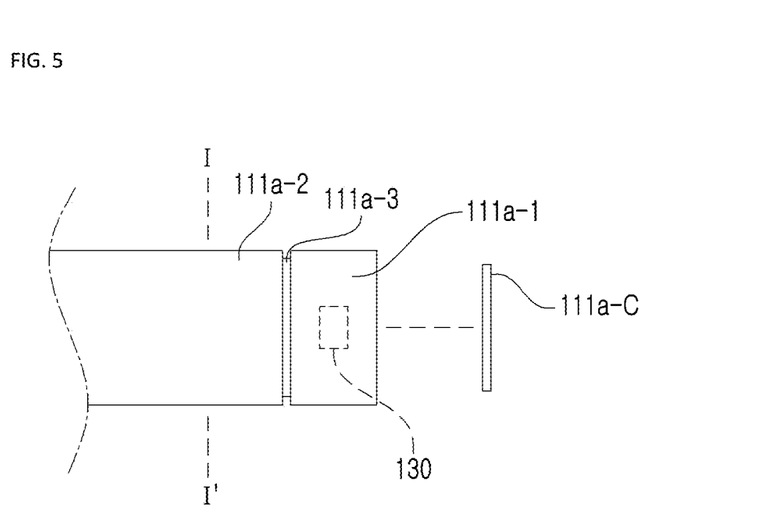
FIG. 5 is an enlarged view of one side of the first body of the smart lighting device equipped with a user interface capable of gesture recognition according to the embodiment of the present invention.
Figure 6:
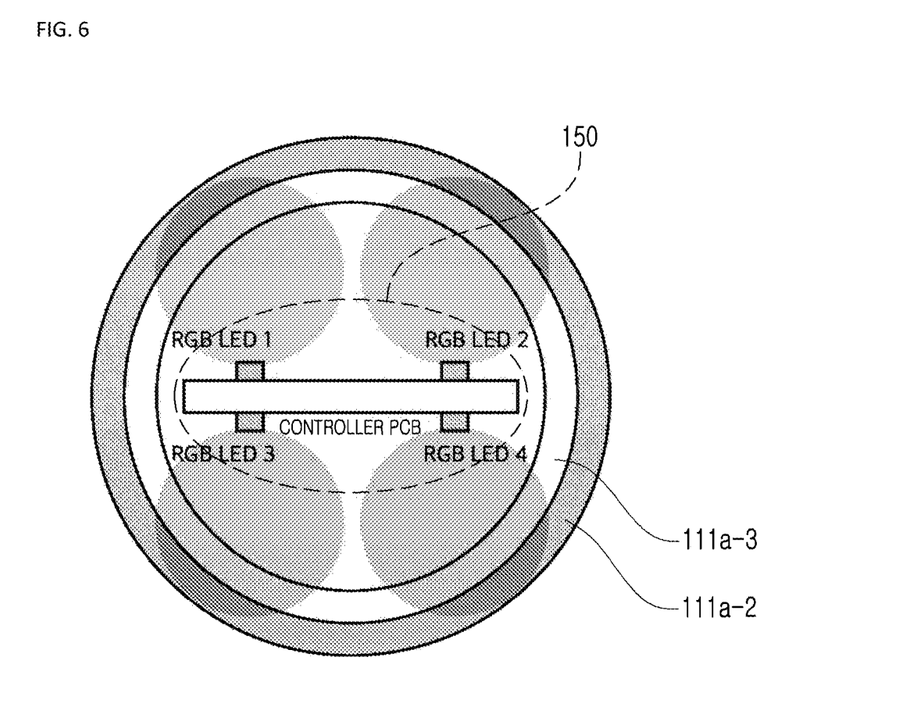
FIG. 6 schematically shows the cross section of the first body taken along line I-I' of FIG. 4.
Figure 7:
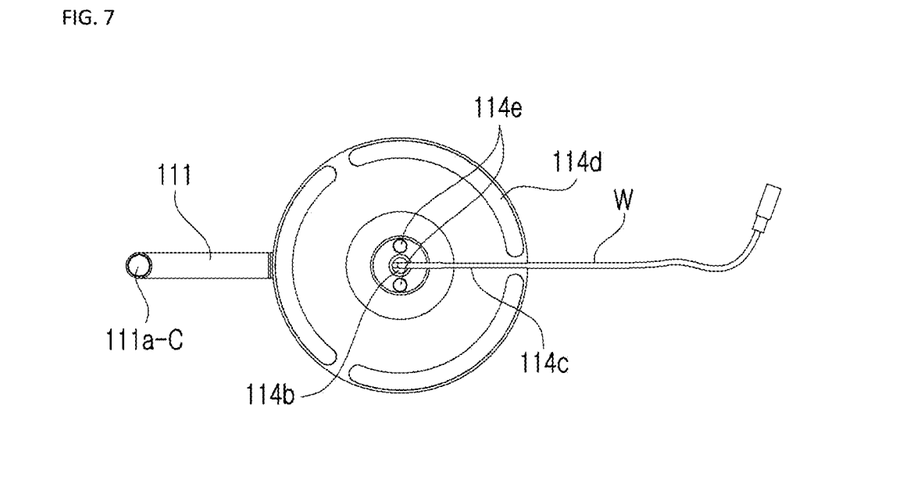
FIG. 7 is a view showing the bottom surface of the smart lighting device equipped with a user interface capable of gesture recognition according to the embodiment of the present invention.

Meanwhile, FIG. 3 is a perspective view of the smart lighting device according to the embodiment of the present invention, FIG. 4 is a rear view of the smart lighting device according to the embodiment of the present invention, FIG. 5 is an enlarged view of one side of the first body of the smart lighting device according to the embodiment of the present invention, FIG. 6 schematically shows the cross section of the first body taken along line I-I' of FIG. 4, and FIG. 7 is a view showing the bottom surface of the smart lighting device according to the embodiment of the present invention.

Referring to FIGS. 3 to 6, the main body 110, i.e., the structure of the smart lighting device 100 proposed by the present invention, will be described in more detail below.

The main body 110 includes a first body 111, a second body 112, a hinge coupling portion 113, and a base 114.

In the first body 111, a plurality of LED chips 120L constituting the LED lighting unit 120 are arranged along the longitudinal direction of the first body 111, and the sensing unit 130 is disposed on one end side of the first body 111.

In this case, the first body 111 includes: a first portion (hereinafter referred to as the "portion 1-1") 111a having a straight tubular shape; a bent portion (hereinafter referred to as the "first bent portion") 111b having a curved tubular shape that extends from the portion 1-1 111a and is bent in one direction; and a second portion (hereinafter referred to as the "portion 1-2") 111c having a straight tubular shape that extends from the first bent portion 111b).

In this case, the LED lighting unit 120 is disposed on one surface of the portion 1-1 111a. This LED lighting unit 120 may include: a light source part (not shown) configured such that a plurality of LED chips 120L are mounted on a PCB (not shown); and a transparent cover 120C configured to cover the overall surface of the arrangement area of the LED chips 120L in order to block the inflow of foreign materials into the inside of the LED lighting unit 120 while transmitting the light, radiated from the plurality of LED chips 120L, therethrough. In this case, although the light radiated from the LED chips 120L may be radiated in a diffused state while being transmitted through the transparent cover 120C, it is obvious that the LED lighting unit 120 may include a diffusion plate (not shown) configured to additionally scatter and diffuse the above light.

Furthermore, the light source part (not shown) includes LED chips 120L having a CRI of 95% or higher, and the number of LED chips 120L is 200 or more, more specifically 300. In this case, the light source part may provide a light source similar to sunlight by providing the LED chips 120L having a high color rendering index. Accordingly, when the smart lighting device 100 proposed by the present invention is used, an object receiving light may be seen cleanly and clearly and also the fatigue of the eyes may be minimized due to less irritation to the eyes, compared to common LED lighting devices.

In addition, the plurality of LED chips 120L provided in the light source part includes a first LED group having a color temperature of 6000 to 6500 K and radiating cold light, and a second LED group having a color temperature of 2500 to 4000 K and radiating warm light. The ratio of the number of LED chips 120L of the first LED group to the number of LED chips 120L of the second LED group is preferably 1:1. In this case, the plurality of LED chips 120L provided in the light source part are alternately arranged such that the LED chips 120L of the different groups are adjacent to each other, or the plurality of LED chips 120L provided in the light source part are arranged such that the LED chips 120L of the same group are arranged in each column and the groups alternately form columns so that the column of one group is adjacent to the column of the other group. However, the present invention is not limited thereto, and the arrangement thereof may be made in various manners. In this case, the numbers of LED chips 120L for respective different color temperatures are the same, so that the color temperature control and brightness control, i.e., dimming, of the LED lighting unit 120 may be facilitated.

More specifically, as the smart lighting device 100 proposed by the present invention is provided with about 300 LED chips 120L having different color temperatures, the steps for color temperature and brightness control are subdivided, so that detailed adjustment can be made for each control mode. Accordingly, it may be easy to implement light having a brightness and color temperature desired by a user.

For reference, in the smart lighting device 100 proposed by the present invention, the plurality of LED chips 120L provided in the light source part are disposed as wide as possible along the longitudinal direction of the portion 1-1 111-a in order to make the smart lighting device 100 as thin as possible. The LED lighting unit 120 having a wide light radiation area uniformly illuminates an overall desk so that less shadow is formed.

Additionally, in the smart lighting device 100 according to the embodiment of the present invention, the LED chips 120L of the LED lighting unit 120 may be disposed in a lighting section (LS) corresponding to a length of 600 to 700 mm, more specifically 610 mm. This length of the lighting section was conceived by taking into consideration the lateral length of commonly used monitors (in the case of an aspect ratio of 16:9, a 27-inch monitor has a lateral length of 604 mm). This length was designed to be suitable for use together with electronic devices disposed on a desk.

In addition, the sensing unit 130 and the status display unit 150 may be disposed on one side of the portion 1-1 111a.

In this case, a transparent cover 111a-C through which the light radiated by the sensing unit 130 is primarily transmitted and through which the light reflected from an object, i.e., a user's hand, located in the sensing area of the sensing unit 130 is secondarily transmitted while being returned to the sensing unit 130 is coupled to an end of the portion 1-1 111a. In this case, the transparent cover 111a-C is made of a material that can transmit the light, generated by the sensing unit 130, therethrough.

Furthermore, an exposure window 111a-W made of a transparent plastic material may be provided at a location spaced apart from the end of the portion 1-1 111a by a predetermined distance.

Referring to FIGS. 4 and 5, the structure of one side of the portion 1-1 111a will be described in more detail below. The portion 1-1 111a may be divided into a first coupling portion 111a-1 disposed adjacent to the first bent portion 111b, a second coupling portion 111a-2 spaced apart from the first coupling portion 111a-1 by a predetermined distance, and a third coupling portion 111a-3 configured such that both ends thereof having a smaller diameter than the first coupling portion 111a-1 and the second coupling portion 111a-2 are provided in an open tubular shape and the outer circumferential surface thereof comes into contact with the inner circumferential surfaces of the first coupling portion 111a-1 and the second coupling portion 111a-2 and are coupled to the inner circumferential surfaces. In this case, a portion of the third coupling portion 111a-3 is exposed through a minute gap of 1 mm or smaller between the first coupling portion 111a-1 and the second coupling portion 111a-2, and functions as the exposure window 111a-W.

In this case, the status display unit 150 may be provided in the state in which four RGB LEDs are mounted on a PCB, as illustrated in FIG. 6. According to the control of the integrated control unit 130, the four RGB LEDs provided in the status display unit 150 operate individually or together, and the light generated by the status display unit 150 is visible to the outside through the exposure window 111*a*-W.

The first bent portion 111*b* is provided in a curved tubular shape that is curved while forming a smooth curve such that the angle formed by the portion 1-1 111*a* and the portion 1-2 111*c* is close to 90 degrees.

The portion 1-2 111*c* has a shorter length than the portion 1-1 111*a*, and the first body 111 including the portion 1-1 111*a*, the first bent portion 111*b* and the portion 1-2 111*c* described above is provided in an inverted and reversed L shape or an L shape.

For reference, the above-described LED lighting unit 120, sensing unit 130, integrated control unit 140, status display unit 150, and power supply unit 160 may be all provided in the portion 1-1 111*a*. In this case, a power supply line W configured to apply power to the power supply unit 160 may be passed through the first bent portion 111*b* and the portion 1-2 111*c*, and the power supply line W drawn out through the end of the first body 111 coupled to the hinge coupling portion 113 may be passed through the hinge coupling portion 113, the second body 112 and the base 114, and may be drawn out through the bottom surface of the base 114 to be exposed to the outside.

The second body 112 is coupled to the opposite side of the first body 111, and is configured to support the first body 111. In this case, the second body 112 includes: a first portion 112*a* (hereinafter referred to as the "portion 2-1") having a straight tubular shape; a bent portion 112*b* (hereinafter referred to as the "second bent portion") having a curved tubular shape that extends from the portion 2-1 112*a* and is bent in one direction; and a second portion 112*c* (hereinafter referred to as a "portion 2-2") having a straight tubular shape that extends from the second bent portion 112*b*.

In this case, the portion 2-1 112*a* has a longer length than the portion 2-2 112*c*, and the second body 112 including the portion 2-1 112*a*, the second bent portion 112*b*, and the portion 2-2 112*c* described above is provided in an inverted and reversed "L" shape or an "L" shape.

In this case, the first body 111 and the second body 112 are configured such that the first portions 111*a* and 112*a* thereof are coupled to the hinge coupling portion 113, and are provided in shapes symmetrical to each other with respect to the hinge coupling portion 113.

In addition, the length l1 from the top to the bottom of the first body 111 is preferably provided to be shorter than the length l2 from the top of the second body 112 to the bottom of the base 114 to be described later so that one end of the first body 111 can be spaced apart from a bottom surface by a predetermined height when the first body 111 is rotated such that the first body 111, the hinge coupling portion 113, and the second body 112 have an inverted "U" shape.

In this case, in the smart lighting device 100 proposed by the present invention, as the first body 111, the hinge coupling portion 113, and the second body 112 have an inverted "U" shape by rotating the first body 111, the space on a desk may be utilized to the maximum even when a product is not in use because space occupancy is low, and the top of the product may be easily gripped and lifted by a hand when the product is moved.

The hinge coupling portion 113 hingedly couples the first body 111 and the second body 112 to each other so that the location of the first body 111 can be fixed at a desired angle while the first body 111 is rotated with respect to the second body 112.

In this case, a free-stop hinge is applied to the hinge coupling portion 113. Accordingly, the hinge coupling portion 113 allows the fixed location of the first body 111 to be easily changed such that the first body 111 is fixed at an angle desired by a user while being rotated in all directions of 360 degrees with respect to the second body 112 or such that the first body 111 is released at a fixed location and then fixed at another angle.

For reference, the first body 111, the second body 112, and the hinge coupling portion 113 described above have the same outer diameter and are provided in shapes in which the outer circumferential surfaces thereof are smoothly connected to one another. In this case, the cross sections of the first body 111, the second body 112, and the hinge coupling portion 113 may be provided to have at least one shape of a circle, an ellipse, a semicircle, and a polygon. Although the smart lighting device 100 according to the embodiment of the present invention has a circular cross section by taking into consideration a design factor, the present invention is not limited thereto.

The base 114 is provided in a plate shape having a predetermined thickness, the second body 112 is coupled to the top surface of the base 114, and the base 114 supports the first body 111 and the second body 112 coupled to each other by the hinge coupling portion 113.

In this case, the base 114 includes a coupling portion 114*a* through which the second body 112 is partially passed and coupled. Furthermore, referring to FIG. 6, the bottom surface of the base 114 includes: a through hole 114*b* configured to expose the power supply line W, drawn out from the second body 112, to the outside; a coupling groove 114*c* configured such that a part of the power supply line W is fitted thereinto so that the power supply line W exposed to the outside through the through hole 114*b* faces one side of the base 114; and a plurality of first support parts 114*d* made of a rubber material and configured to limit the movement of the base 114.

In this case, the bottom surface of the base 114 may be provided in a shape in which the height by which the bottom surface spaced apart from the top surface of a desk becomes longer toward the center of the base 114 by taking into consideration the fact that the power supply line W is drawn out through the through hole 114*b*. In this case, second support portions 114*e* formed such that the bottom surfaces thereof are located on the same level as the bottom surfaces of the first support portions 114*d* disposed on a desk and configured to additionally support the base 114 may be provided around the through hole 114*b*.

For reference, at least any one of the first body 111, the second body 112, the hinge coupling portion 113, and the base 114 may be made of aluminum. The smart lighting device 100 according to the embodiment of the present invention has a simple yet sophisticated appearance because all of the above-described components are made of aluminum.

In this case, AL6063 may be applied as the aluminum used to fabricate the above-described components. AL6063 is an Mg—Si-based aluminum alloy and has excellent mechanical properties, and is applied to solve problems in product lifespan and user safety attributable to the heat generated by the LED lighting unit 120. Furthermore, the aluminum alloy applied to the present invention is the most suitable material for anodizing, and enables a smooth surface and the application of various colors.

<Description of Control of Smart Lighting Device>

Figure 8:
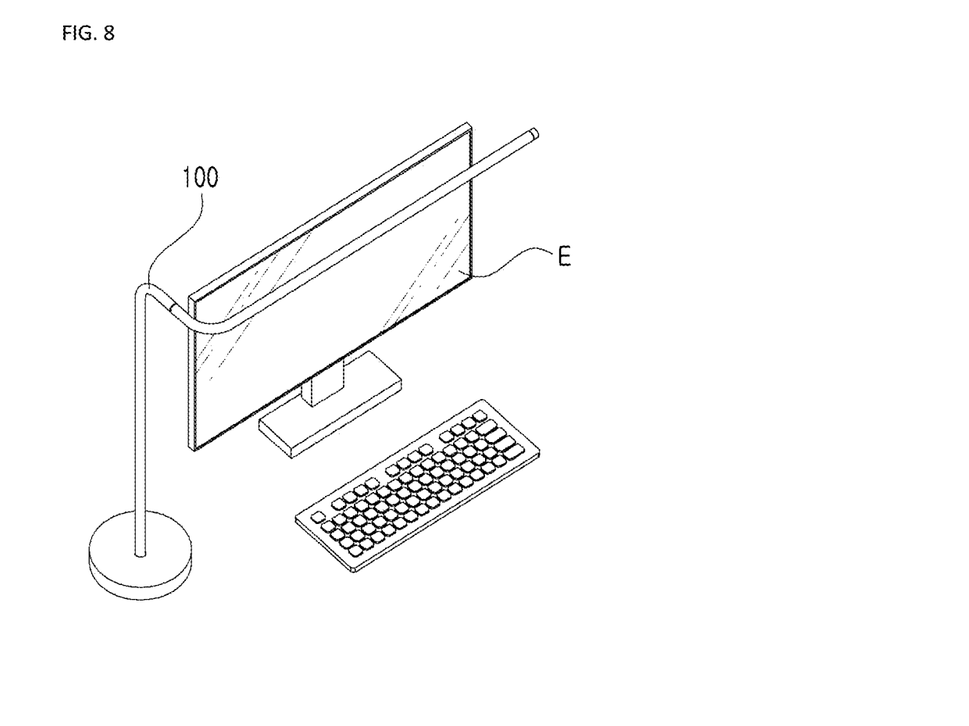
FIG. 8 illustrates an embodiment of a smart lighting device equipped with a user interface capable of gesture recognition that is proposed by the present invention.
Figure 9:
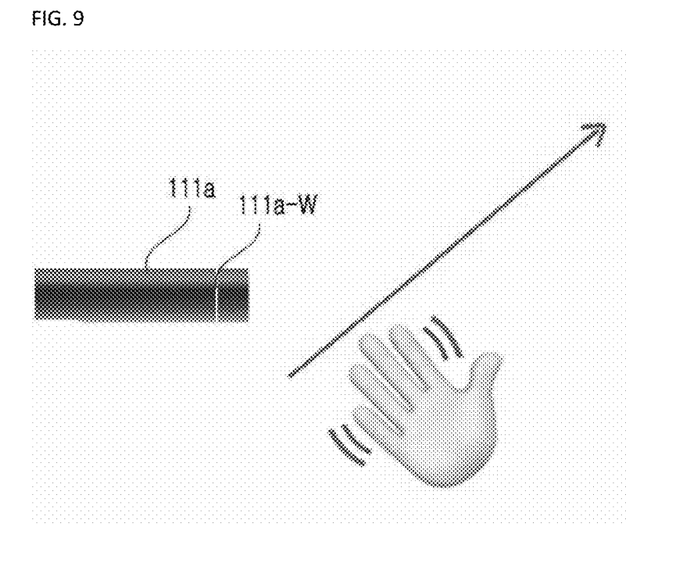
FIGS. 9, 10 and 11 are exemplary views illustrating a non-contact control method for a smart lighting device equipped with a user interface capable of gesture recognition that is performed based on motion recognition.
Figure 10:
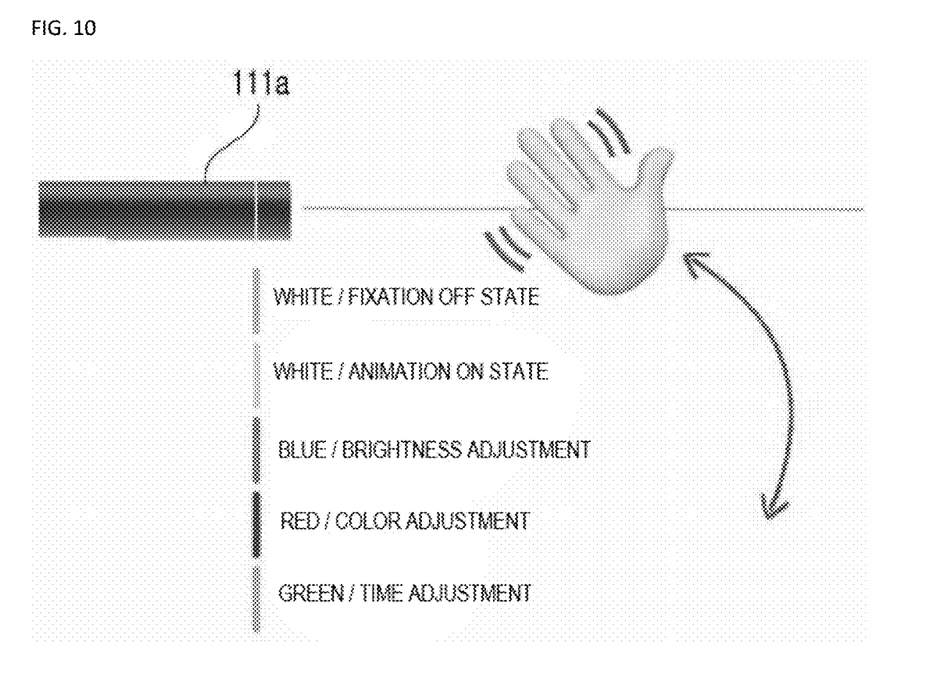
Figure 11:
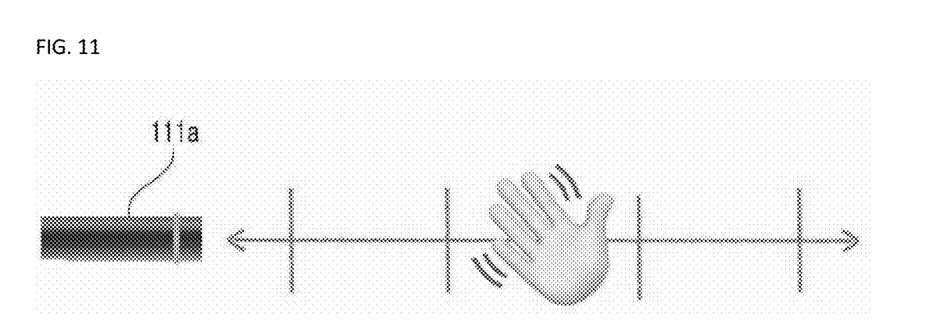

FIG. 8 illustrates an embodiment of a smart lighting device proposed by the present invention, and FIGS. 9 to 11 are exemplary views illustrating a non-contact control method for a smart lighting device that is performed based on motion recognition.

First, referring to FIG. 8, there is illustrated one embodiment of a desk lamp-type smart lighting device 100 that is a type of desk lamp that is disposed and used on a desk. In this case, although the desk lamp-type smart lighting device 100 proposed by the present invention is designed to be optimized for use along with an electronic device, it is obvious that the use thereof is not limited thereto.

When the desk lamp-type smart lighting device 100 proposed by the present invention is fixed at a location suitable for the radiation of light toward a desk through the rotation of the first body 111 after being disposed on the desk, the first body 111 is located in front of the second body 112 and emits light in front of the screen of an electronic device E. Accordingly, the present invention may radiate uniform light onto a corresponding area to facilitate the performance of a task, such as the manipulation of a keyboard or mouse, learning, or the checking of a task-related document, when the task is performed in front of the location at which the electronic device E is disposed.

In addition, as the smart lighting device 100 proposed by the present invention is implemented to be thin, a heat problem involving a temperature of about 40 to 50° C. may occur near the first body 111 on which the LED lighting unit 120 is disposed. However, the body 110 is made of aluminum by taking into consideration safety, so that the design is made to primarily dissipate heat. In this case, as a temperature sensor (not shown) is located near the LED lighting unit 120 of the first body 111 and monitors the heat status of the LED lighting unit 120, the smart lighting device 100 considering secondary safety may be provided. In this case, the temperature sensor measures temperature at predetermined intervals (e.g., of three seconds) and generates measurement information about them, and the integrated control unit 140 receives the corresponding measurement information from the temperature sensor in real time, monitors the corresponding measurement information, and may control individual units so that the power of the smart lighting device 100 is automatically turned off when the temperature reaches or exceeds a preset temperature.

Additionally, by taking into consideration the safety and convenience of a user, all the functions of the smart lighting device 100 may be controlled through motions of the user's hand, i.e., gestures, so that an implementation is made such that the user's hand does not come into contact with the smart lighting device 100.

For reference, the first body 111 is located to be higher than the top of a monitor and also disposed to protrude forward of the monitor. Accordingly, when a user makes a gesture to adjust the function of the smart lighting device 100 according to need, there is no element that prevents the user's hand from approaching one side of the first body 111 where the sensing unit 130 is located. Therefore, it may be possible to easily control the functions in a non-contact manner during a task.

A non-contact control method for the smart lighting device 100 based on motion recognition will be described in more detail below with reference to FIGS. 9 to 11.

First, referring to FIGS. 9 and 10, when a second gesture in which a user's hand passes by in front of one side of the first body 111 on which the sensing unit 130 is disposed, more specifically in front of the transparent cover 111a-C, is made, the sensing unit 130 generates it as sensing information. In this case, the integrated control unit 140 receives the sensing information from the sensing unit 130 and controls the LED lighting unit 120 to perform a control mode corresponding to the corresponding gesture based on preset control information.

For reference, control information corresponding to the sensing information for the second gesture is related to ON/OFF of the LED lighting unit 120 and a change of control mode.

In this case, when the sensing information for the second gesture is provided to the integrated control unit 140, the LED lighting unit 120 operates to be turned on when it is in an OFF state, or operates to be turned off when it is in an ON state.

When, in the state in which the LED lighting unit 120 is turned off, the user's hand is located in front of and adjacent to one side of the first body 111 on which the sensing unit 130 is disposed, and the first gesture of locating the user's hand for a predetermined period of time is made, the LED lighting unit 120 is turned on to be dark. In contrast, when the first gesture is made at a location where the user's hand is away from the sensing unit 130, the LED lighting unit 120 operates to be turned on to be bright.

In addition, when, in the state in which the LED lighting unit 120 is turned on, the first gesture of locating the user's hand in front of one side of the first body 111 on which the sensing unit 130 is disposed for a predetermined period of time is made, the sensing unit 130 generates it as sensing information. Furthermore, the integrated control unit 140 provided with this information makes a change of control mode to a control mode corresponding to the corresponding gesture based on the preset control information, and may wait for adjustment for detailed settings in the corresponding control mode according to the additional gesture recognition of the sensing unit 130.

In this case, the integrated control unit 140 may control the status display unit 150 so that the status display unit 150 changes and outputs the color of the LEDs provided in the status display unit 150 while emitting a short buzzer sound, thereby giving the user an ON/OFF control mode, thereby notifying the user of the change to another control mode from an ON/OFF control mode.

When, in the state in which the integrated control unit 140 waits for an adjustment for detailed settings in any one control mode, the user's hand leaves the sensing area of the sensing unit 130 and is located in the sensing area again, the sensing unit 130 recognize this as a first gesture once more. Furthermore, the integrated control unit 140 provided with sensing information about the above recognition makes a change to another control mode and waits for an adjustment for detailed settings in the corresponding control mode. In this case, the integrated control unit 140 may control the status display unit 150 to notify the user of corresponding status information by means of a short buzzer sound while displaying the status information to the outside.

For reference, the status display unit 150 may notify the user of the status information of the smart lighting device 100 through the color(s) of the four RGB LEDs in such a manner that the four RGB LEDs are lit collectively in a unique color or alternately lit individually according to a control mode corresponding to sensing information or an adjustment for the detailed settings in the corresponding control mode.

In this case, the color of the LEDs may be preset to shine in blue for a control mode for brightness adjustment, in red for a control mode for color temperature (or color) adjustment, and in green for a control mode for timer setting. In this case, it is obvious that the light viewed in all directions of 360 degrees through the exposure window 111*c*-W is operated as if it rotates according to a gesture of the user's hand (e.g., a third gesture) through the four LEDs that are individually lit in a ring shape.

In addition, when, in the state in which the integrated control unit 140 waits for an adjustment for detailed settings in any one control mode, a third gesture in which the user's hand approaches or recedes is made in front of one side of the first body 111 on which the sensing unit 130 is disposed, the sensing unit 130 generates it as sensing information. In this case, the integrated control unit 140 receives the sensing information from the sensing unit 130 and controls the LED lighting unit 120 to perform a control mode corresponding to the corresponding gesture based on the preset control information.

For reference, the control information corresponding to the sensing information for the third gesture includes detailed adjustment information for each control mode based on the distance between the user's hand and the sensor.

In other words, when the integrated control unit 140 receives the sensing information for the third gesture, it controls the status display unit 150 so that the status information therefor is visible to the outside while controlling the LED lighting unit 120 so that in the control mode for brightness adjustment, the light radiated through the LED lighting unit 120 becomes darker as the user's hand approaches or becomes brighter as the user's hand recedes.

In this case, the light generated through the status display unit 150 may also be darkened or brightened according to the dimming operation of the LED lighting unit 120. When an adjustment range reaches the maximum/minimum, the movement of the LEDs, which are alternately lit and visible as if they are moving in the status display unit 150 along with a sound, may be stopped.

In addition, when the integrated control unit 140 receives the sensing information for the third gesture, overall control may be performed through the integrated control unit 140 so that in the control mode for color temperature control, the light of the LED lighting unit 120 is adjusted to a warmer color as the user's hand approaches one side of the first body 111 or is adjusted to a cooler color as the user's hand recedes from the side of the first body 111.

In addition, as shown in FIG. 11, when the integrated control unit 140 receives the sensing information for the third gesture, overall control may be performed through the integrated control unit 140 so that in the control mode for timer setting, scheduled turning off after a shorter period of time is performed as the user's hand approaches one side of the first body 111 or scheduled turning off after a longer period of time is performed as the user's hand recedes from the side of the first body 111.

In this case, in the case of timer setting, set periods of time for respective sections are different (for example, 15 minutes, 30 minutes, 60 minutes, and 90 minutes). When the user's hand is located for each section, it may be notified to the user by sound. In this case, overall control is performed through the integrated control unit 140 so that the color visible to the outside from the status display unit 150 can be maintained in a green changed state when scheduled turning off is completed and the LED lighting unit 120 can be turned off when a set period of time has elapsed For reference, the detailed adjustment for each control mode according to the distance between the sensing unit 130 and the user's hand is not limited to the above-described embodiment, and it is obvious that settings may be made such that the opposite operations are performed (e.g., an adjustment to a brighter color, an adjustment to a cooler color, or scheduled turning off after a longer period of time may be made as the user's hand approaches, and an adjustment to a darker color, an adjustment to a warmer color, or scheduled turning off after a shorter period of time may be made as the user's hand recedes).

In addition, in the state in which the operation of the LED lighting unit 120 is not performed, the status display unit 150 generates white light whose movement is fixed, so that the user can recognize that external power is being applied to the smart lighting device 100. Furthermore, when the LED lighting unit 120 is operated to be turned on by the sensing information generated by the sensing unit 130, the status display unit 150 is illuminated with white light that is brighter than the white light generated in the OFF state. When the LED lighting unit 120 is turned on to be dark in a bright environment, the user may easily recognize that the operation of the smart lighting device 100 is being performed from this status display. As described above, according to the present invention, the following effects may be achieved:

First, all the functions of the smart lighting device can be controlled in a non-contact manner through motions of a user's hand, i.e., gestures, so that convenience in use can be provided to the user.

Second, a long lifespan can be guaranteed due to no use of a physical switch.

Third, light similar to sunlight is radiated from the LED lighting unit composed of LED chips having a color rendering index (CRI) of 95% or higher, so that the fatigue of the eyes of a user can be minimized and also the LED lighting unit allows an object receiving light to appear cleaner and clearer than lighting devices using common LED chips.

Fourth, the above-described LED chips are implemented to be arranged in a wide lighting section along the longitudinal direction of the first body, so that a large area of a desk can be illuminated uniformly and less shadow is made to appear by using the wide light source, thereby promoting the improvement of work or academic performance.

Fifth, an optimal size and structure can be provided by taking into consideration use along with an electronic device such as a monitor.

Sixth, the first body, the second body, and the hinge coupling portion are formed to be thin and also the shape can be changed by freely rotating the first body with respect to the second body. Accordingly, the space on a desk can be utilized to the maximum even when the product is not in use because space occupancy is low, and the product can be easily moved and packed when the main body is changed to have a converted "U" shape by the rotation of the first body.

Seventh, the first body, the second body, the hinge coupling portion, and the base constituting the smart lighting device are all made of aluminum, so that a simple and stylish appearance is provided and also product life and safety are improved against the heat dissipation of the LEDs.

Although the detailed description of the present invention has been made above in conjunction with the embodiments taken with reference to the accompanying drawings, the above-described embodiments illustrate only examples of the present invention. Therefore, the present invention should not be understood as being limited only to the above embodiments, and the scope of the present invention should be understood as encompassing the following claims and their equivalents.

What is claimed is:

1. A smart lighting device equipped with a user interface capable of gesture recognition, the smart lighting device comprising:
   a main body provided with a light-emitting diode (LED) lighting unit;
   a sensing unit embedded in the main body, and configured to detect a gesture of a user's hand located a predetermined distance apart from a region of the main body and to generate sensing information for the gesture of the user's hand;
   an integrated control unit embedded in the main body, and configured to control individual units so that a setting adjustment for any one of control modes, including at least any one of a brightness setting, color temperature setting, and timer setting of the LED lighting unit and ON/OFF control, corresponding to the sensing information can be made based on previously stored control information; and
   a power supply unit configured to supply an operating voltage so that the LED lighting unit, the sensing unit, and the integrated control unit can operate,
   wherein the main body comprises:
   a first body configured such that a plurality of LED chips constituting the LED lighting unit are arranged along a longitudinal direction thereof;
   a second body coupled to an opposite side of the first body, and configured to support the first body;
   a hinge coupling portion configured to hingedly couple the first body and the second body to each other so that a location of the first body can be fixed at a desired angle while the first body is rotated with respect to the second body; and
   a base provided in a plate shape having a predetermined thickness, formed such that the second body is coupled to a top surface thereof, and configured to support the first body and the second body coupled to each other by the hinge coupling portion,
   wherein each of the first body and the second body comprises:
   a first portion having a straight tubular shape;
   a bent portion having a curved tubular shape that extends from the first portion and is bent in one direction; and
   a second portion having a straight tubular shape that extends from the bent portion;
   the first portion has a longer length than the second portion; and
   the first body and the second body are configured such that the second portions thereof are coupled to the hinge coupling portion, and are provided in shapes symmetrical to each other with respect to the hinge coupling portion.

2. The smart lighting device of claim 1, further comprising a status display unit provided in the main body and configured to display status information about at least any one of the control mode of the LED lighting unit controlled by the integrated control unit and a setting adjustment status therefor to an outside.

3. The smart lighting device of claim 1, wherein the sensing unit is an infrared laser sensor configured to calculate distance information from a region of the main body to the user's hand by using a Time of Flight (ToF) method and to generate sensing information about a gesture of the user's hand, in which the user's hand approaches to or recedes from the region of the main body, from the distance information.

4. The smart lighting device of claim 3, wherein the integrated control unit controls the LED lighting unit and the status display unit so that, as a change of control mode to the control mode corresponding to the sensing information generated by the sensing unit is made or a setting adjustment for the corresponding control mode is made, corresponding state information is output as at least one of an optical signal and a sound signal.

5. The smart lighting device of claim 1, wherein:
   at least any one of the first body, the second body, the hinge coupling portion, and the base is made of aluminum.

6. The smart lighting device of claim 5, wherein the sensing unit is disposed on one end side of the first body, and detects a gesture of the user's hand in which the user's hand approaches to or recedes from one end of the first body.

7. The smart lighting device of claim 1, wherein the sensing unit and the integrated control unit are embedded in the first body.

* * * * *